United States Patent
Kim et al.

(10) Patent No.: US 11,513,207 B2
(45) Date of Patent: Nov. 29, 2022

(54) DISPLAY CONTROL DEVICES AND METHODS

(71) Applicant: Infineon Technologies AG, Neubiberg (DE)

(72) Inventors: Youn Joo Kim, Munich (DE); Abhiram Chakraborty, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 367 days.

(21) Appl. No.: 16/589,537

(22) Filed: Oct. 1, 2019

(65) Prior Publication Data

US 2020/0103516 A1 Apr. 2, 2020

(30) Foreign Application Priority Data

Oct. 2, 2018 (DE) .......................... 102018124385.5

(51) Int. Cl.
*G01S 13/56* (2006.01)
*G01S 13/87* (2006.01)

(52) U.S. Cl.
CPC .............. *G01S 13/56* (2013.01); *G01S 13/87* (2013.01)

(58) Field of Classification Search
CPC .......... G01S 13/56; G01S 13/87; G01S 13/50; A61B 5/08; A61M 21/00
See application file for complete search history.

(56) References Cited

U.S. PATENT DOCUMENTS

| | | | |
|---|---|---|---|
| 10,677,905 B2 | 6/2020 | Baheti et al. | |
| 2007/0156317 A1 | 7/2007 | Breed | |
| 2010/0152600 A1* | 6/2010 | Droitcour | G01S 13/583 600/534 |
| 2012/0287035 A1 | 11/2012 | Valko et al. | |
| 2016/0133201 A1* | 5/2016 | Border | G06F 1/163 345/694 |
| 2016/0286626 A1 | 9/2016 | Kano | |
| 2016/0370463 A1* | 12/2016 | Schwager | G01S 13/867 |
| 2017/0052596 A1* | 2/2017 | Li | G01S 7/5273 |
| 2017/0193282 A1 | 7/2017 | Valko et al. | |
| 2017/0343648 A1 | 11/2017 | Trotta et al. | |
| 2018/0273030 A1* | 9/2018 | Weldon | B60W 30/09 |
| 2018/0279884 A1* | 10/2018 | Ahmad | A61B 5/725 |
| 2018/0329050 A1* | 11/2018 | Amihood | G01S 13/18 |
| 2019/0279479 A1* | 9/2019 | Reunamaki | G08B 25/08 |
| 2020/0249346 A1* | 8/2020 | Li | G01S 15/876 |

FOREIGN PATENT DOCUMENTS

| | | | | |
|---|---|---|---|---|
| EP | 2263530 A1 | * | 12/2010 | ............ A61B 5/16 |
| WO | WO-2012158840 A1 | * | 11/2012 | ............ A61B 5/002 |

OTHER PUBLICATIONS

Yu, Zhibin et al., "Doppler Radar Vital Signs Detection Method Based on Higher Order Cyclostationary", Sensors, MDPI, Dec. 26, 2017, 20 pages.

(Continued)

*Primary Examiner* — Vladimir Magloire
*Assistant Examiner* — Nazra Nur Waheed
(74) *Attorney, Agent, or Firm* — Slater Matsil, LLP

(57) ABSTRACT

Display control devices and methods are provided. Vital functions of a person are detected using a radar circuit, and power consumption of a display is controlled based on the detected vital functions.

19 Claims, 9 Drawing Sheets

(56) References Cited

OTHER PUBLICATIONS

Baboli, Mehran et al., "Good Night: Sleep Monitoring Using a Physiological Radar Monitoring System Integrated with a Polysomnography System", IEEE Microwave Magazine, Jul. 5, 2015, 8 pages.

Hong, Hong et al., "Noncontact Sleep Stage Estimation Using a CW Doppler Radar", IEEE Journal of Emerging and Selected Topics in Circuits and Systems, vol. 8, No. 2, Jun. 2018, 12 pages.

He, Mi et al., "Novel Signal processing method for vital sign monitoring using FMCW radar", Biomedical Signal Processing and Control, Elsevier.com, China, Dec. 30, 2016, 11 pages.

Lu, Guohua et al., "Contact-Free Measurement of Heartbeat Signal via a Doppler Radar Using Adaptive Filtering", International Conference on Image Analysis and Signal Processing, Apr. 9-11, 2010, 4 pages.

\* cited by examiner

DISPLAY CONTROL DEVICES AND METHODS

This application claims the benefit of German Application No. 102018124385.5, filed on Oct. 2, 2018, which application is hereby incorporated herein by reference.

TECHNICAL FIELD

The present application relates to display control devices and methods for controlling displays.

BACKGROUND

Displays are used in many applications to provide content to a user. Examples for systems using displays include television systems, in-flight entertainment systems in planes or other vehicles, or computer displays. Even if new technologies like Organic Light Emitting Diodes (OLED) or large size liquid-crystal displays (LCD) offer reduced power consumption compared to previously picture tube systems, power saving by such new technologies is offset by steadily growing display sizes in particular for entertainment systems like televisions. For example, the power consumption approximately doubles from a 40 inch (approximately 100 cm) display to a 60 inch (approximately 150 cm) display, where, as usual in display technology, the diagonal of the display is measured to give the size.

In some situations, a display is not actually viewed. For example, sometimes, a user turns on the television, but then leaves the room and does not actually view the display.

Therefore, display control devices using motion detection using for example infrared sensors, cameras or motion detection based on electromagnetic waves or passive infrared sensors (PIR) have been proposed. With such devices, when no movement is detected for a certain period in front of the display, the display is turned off, as it is then assumed that no one is actually in front of the display to view the same.

However, conventional display control devices suffer from various drawbacks. For example, display control devices using motion detectors based on conventional electromagnetic waves or PIR sensors have the problem of giving a large number of false alarms (for example not detecting motion when there actually is motion), which may lead to inadvertently turning off the television when a user is still present in front of it. In particular, some very minute motions like lifting hands or slight body movements may not be picked up by such conventional motion detectors. Cameras on the other hand have the drawback that they may have a problem in low light conditions, which frequently occur inside a room when viewing a television, in particular in the evening or night when it is dark outside. Furthermore, cameras may also cause privacy concerns.

SUMMARY

According to an embodiment, a display control device is provided, comprising a radar circuit and an evaluation circuit. The evaluation circuit is configured to detect a vital function of a person based on a signal from the radar circuit and control a power consumption of a display based on the detected vital function.

Furthermore, according to another embodiment, a method is provided, comprising detecting a vital function of a person using a radar, and controlling a power consumption of a display based on the detected vital function.

The above summary is merely intended to give a short overview over some features of some embodiments and is not to be construed as limiting.

DETAILED DESCRIPTION OF ILLUSTRATIVE EMBODIMENTS

In the following, various embodiments will be described referring to the attached drawings. It should be noted that these embodiments are given for illustrative purposes only and are not to be construed as limiting. Variations, modifications or details described with respect to one of the embodiments may also be applied to other embodiments and will therefore not be repeatedly described. Features or elements from different embodiments may be combined to form further embodiments unless noted otherwise.

Figure 1:
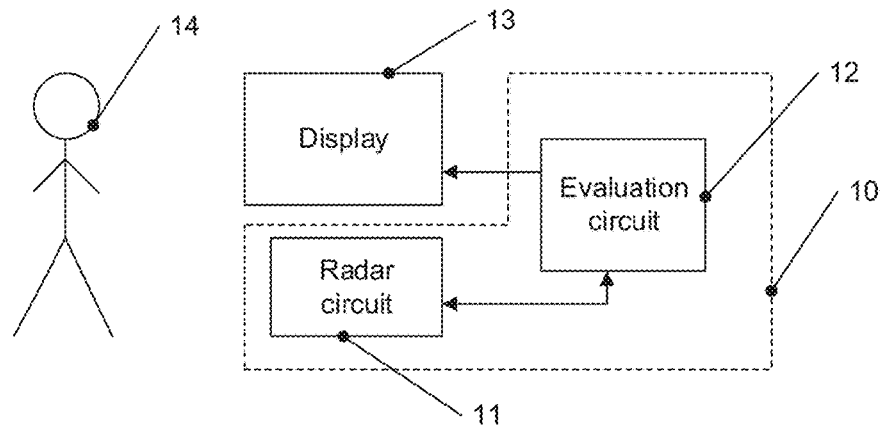
FIG. 1 is a block diagram of a system according to an embodiment.

FIG. 1 is a block diagram illustrating a system according to an embodiment. The system of FIG. 1 comprises a display control device 10 and a display 13 controlled by display control device 10. Display 13 may for example be a screen of a TV or other entertainment system like an in-flight entertainment system in a plane or an entertainment system in another type of vehicle, or may also be a display of a computer, just to give a few examples. In a specific embodiment, the display forms part of an electronic device adapted to be powered using only an onboard energy source such as a battery. For instance, it may form part of a laptop computer. It may alternatively form part of a smartphone or smart tablet.

Display control circuit 10 comprises a radar circuit 11 and an evaluation circuit 12. Radar circuit 11 is used to detect vital functions, or vital functions and movement of a person 14 in an area in front of display 13. Vital functions may include functions like heartbeat or breathing rate. To detect such functions, signals from radar circuit 11 are processed in evaluation circuit 12. Based on the detected vital functions and also optionally based on detected movement of person 14, evaluation circuit 12 controls a power consumption of display 13.

Radar circuit 11 may be any radar circuit suitable for detecting vital functions, for example a Doppler radar, Frequency Shift Keying (FSK) Radar, Multi-frequency continuous wave radar (MFCW) or a frequency modulated continuous wave (FMCW) radar. Detection of vital functions using such radar circuits per se may be done in a conventional manner known to persons skilled in the art, where essentially an influence of small movements caused by heartbeat or breathing in the radar signal is detected using micro Doppler analysis. Such techniques are for example described in Z. Yu et al., Sensors 2018, 18, 47. Evaluation circuit 12 may be any suitable circuit to process the signals from radar circuit 11 and to control power consumption of display 13 accordingly. For example, evaluation circuit 12 may comprise one or more microcontrollers, correspondingly programmed general purpose processors, digital signal processors, logic circuits, application-specific integrated circuits (ASICs), field programmable gate arrays (FPGAs) or the like. In some embodiments, evaluation circuit 12 may be a dedicated evaluation circuit used only for evaluating radar signals from radar circuit n and controlling display 13 accordingly. In other embodiments, evaluation circuit 12 may also be used for other functions. For example, evaluation circuit 12 may be a microcontroller used for controlling various functions of a television set including display 13, for example program selection or other control functions, and may additionally be used for the power consumption control described herein.

By detecting vital functions, in some embodiments, as described later in detail, also presence of a non-moving person may be detected. Moreover, by evaluating vital functions a sleeping person may be distinguished from a person who is awake, and in case of a sleeping person, display 13 may be controlled to reduce power consumption. In some embodiments, for example when an FMCW radar is used, display control device 10 may also be used to monitor vital functions and/or movement of a plurality of persons, and for example only reduce the power consumption of display 13 if the evaluation shows that none of the persons watches the display (for example all persons are asleep). For example, a display of an in-flight entertainment system or a TV may be turned off when a person watching it falls asleep. Reducing power consumption of display 13 may for example include turning off display 13 or reducing a brightness of display 13. Just to give an example, reducing a backlight brightness of a display from 300 nits to 50 nits, power consumption of the display may be reduced by about 60% in some implementations. Reducing power consumption of display 13 may be performed in various steps in some embodiments. In a first step, display brightness, contrast and/or color saturation may be reduced. In a second step, a backlight of the display may be reduced. In a third step, the backlight of the display may be turned off completely. In a fourth step, display and backlight may be turned off. In a fifth step, a complete system (e.g., television set, inflight entertainment system) including display 13 may be turned off, including e.g., turning off audio of the systems. These are just examples, and in other embodiments some steps may be omitted, or only a single step of these measures may be implemented, or other measures reducing power consumption may be used.

Conversely, when movement of person 14 is detected or the vital functions show that the person has woken up after sleep, the display may be set to a normal operation without power reduction again.

It should be noted that the detection of vital functions and corresponding control of display 1 described may be performed continuously, or only in intervals. For example, vital functions and/or movement may be detected every minute, every five minutes or in other irregular or irregular intervals. In some embodiments, in this way the radar circuit needs to be active only part of time, which may contribute to power consumption reduction of the system. In some implementations, in this way a very low standby current may be achieved for a system or device, which is a major requirement for many modern electronic devices.

Implementation examples for display control device 10 and for the operation to control display 13 will be discussed in more detail referring to FIGS. 2 to 11 below.

Figure 2:
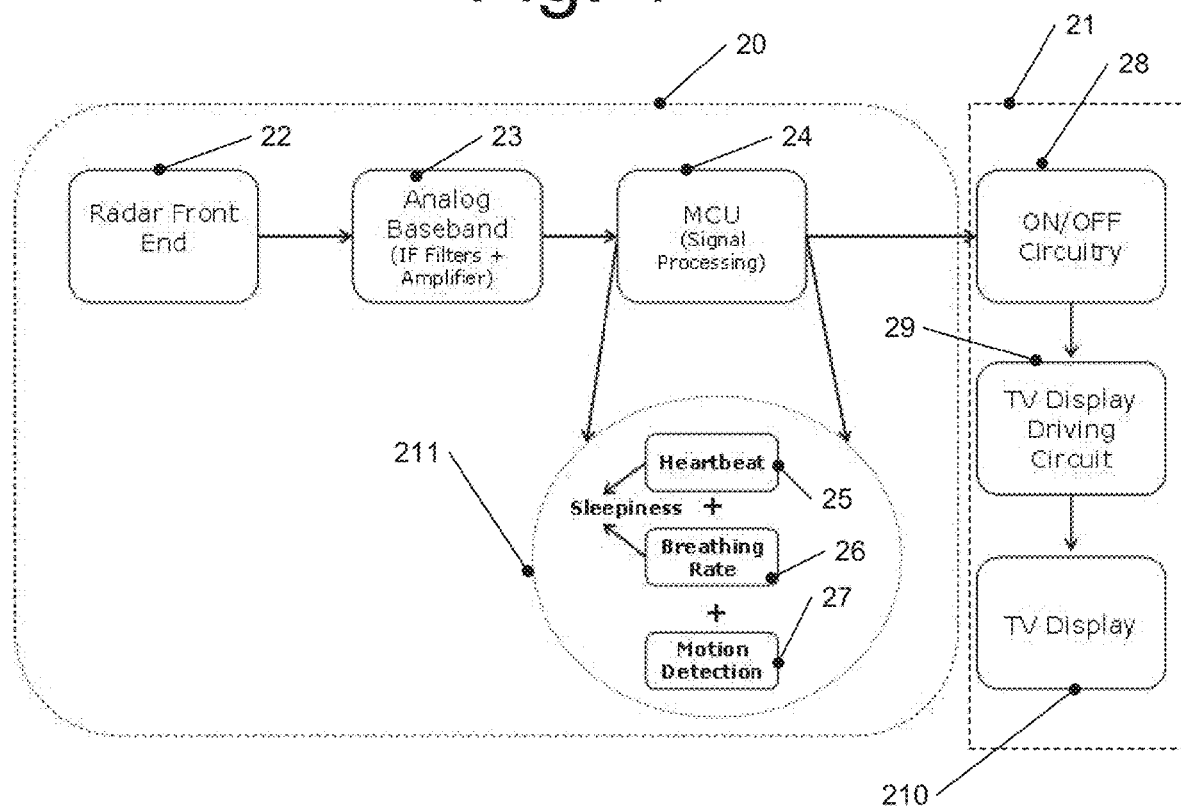
FIG. 2 is a block diagram of a system according to a further embodiment.

FIG. 2 is a block diagram of a system according to a further embodiment. The system of FIG. 2 comprises a display control device 20 and a television set (TV) 21. Display control device 20 comprises a radar front end circuit 22 which transmits radar signals and detects radar signals reflected from objects, in particular one or more persons like person 14. The detected signals are processed by analog baseband circuitry 23, which comprises for example IF (intermediate frequency) filters and amplifiers. The thus processed analog baseband signals are then digitized and processed in a microcontroller unit (MCU) 24. MCU 24 evaluates the digitized signals and detects parameters 211 including vital functions like heartbeat 25 and breathing rated 26 as well as motion 27, i.e., movement of a person. Based on these parameters, MCU 24 controls an on/off circuitry 28 of TV 21. On/off circuitry turns a driving circuit 29 for a display 210 of the TV on and off and therefore turns display 210 on and off. For example, when the detected parameter indicates an awake person in front of display 210, display 210 is driven normally. If no presence of a person (no motion, no vital functions) or a sleeping person is detected, this on/off circuitry 28 may be controlled by MCU 24 to turn of driving circuit 29 and therefore display 210. A sleeping person may for example be detected based on a decrease of heartbeat 25 and/or breathing rate 26 compared to a previous value, or by heartbeat and breathing rate falling below predefined thresholds.

In the first case, heartbeat and breathing rate may be monitored over time, and a decrease by more than a predefined amount (for example a predefined percentage) may be interpreted as the person falling asleep. In the latter case, predefined thresholds are used, which may be user configurable. In other embodiments, to have some averaging, the vital functions may be integrated over predefined periods of times, and when the integrated vital functions drop significantly, this is taken as an indication that the person has fallen asleep.

Conversely, when after turning driving circuit 29 OFF, heartbeat and breathing rate increase again or motion is detected, the MCU 24 controls on/off circuitry 28 to turn TV display driving circuit 29 on again, such that a person in front of TV display 210 may continue to watch TV.

Next, referring to the FIGS. 3 to 5 methods according to various embodiments will be discussed. While the methods may be implemented using the systems described with reference to FIGS. 1 and 2 above or described with reference to FIGS. 6 and 10 further below and, for ease of illustration and to avoid repetitions, will be described referring to the explanations of FIGS. 1 and 2, the methods may also be implemented using other systems.

Figure 3:
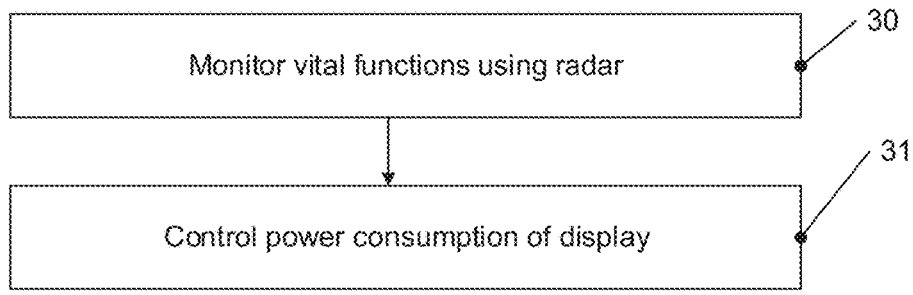
FIG. 3 is a flowchart illustrating a method according to an embodiment.

The method of FIG. 3 may be triggered by turning on of a system comprising the display, for example by turning on of a television.

At 30 in FIG. 3, the method comprises monitoring vital functions of a person using a radar, in particular for monitoring heartbeat and breathing rate. In embodiments, in particular the micro-Doppler effect may be used for monitoring vital functions, in which case the radar may also be referred to as micro-Doppler radar. In some embodiments, this may be used to also identify a type of living being for which vital functions are detected and monitored. For example, using a detected micro-Doppler signature, humans may be distinguished from animals like pets, and/or children may be distinguished from adults. This may be done by evaluating detected breathing rate and heartbeat frequency: Animals generally have higher breathing rate and heartbeat frequency than humans, and for humans, children have higher breathing rate and heartbeat frequency than adults. The younger the children are, the higher breathing rate and heartbeat frequency are. Detected movement may additionally be used for the application, as e.g., the typical movement of an animal like a cat or a dog may differ from human movement.

At 31, the method comprises controlling power consumption of a display based on the monitored vital functions, for example by reducing power consumption by turning the display off or reducing its brightness when the vital functions indicate absence of a person or a sleeping person, and setting the display back to normal operation when the vital functions indicate the presence of an awake person. The controlling may also be based on a type of living being identified as explained above. For example, animals may be ignored, i.e., a detected animal may be treated as if no person were detected. In this way, pets do not influence operation of the display. If only children are detected, the display may be turned off after a predefined time, which may be user configurable, e.g., configurable by the parents.

Figure 4:
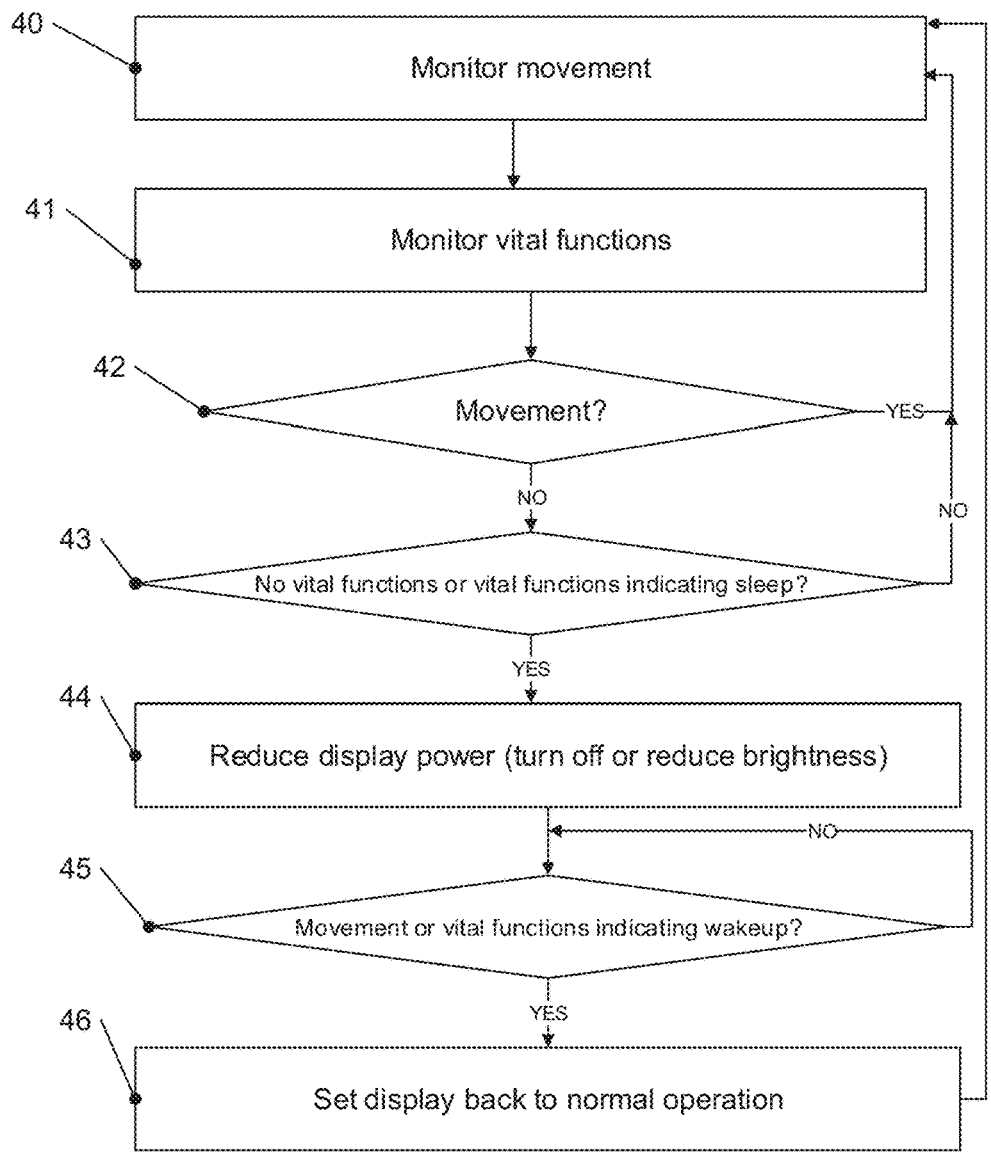
FIG. 4 is a flowchart illustrating a method according to a further embodiment.

FIG. 4 is a flowchart illustrating a method according to a further embodiment, which gives a more detailed example on how vital functions and additionally movement may be monitored and used to control power consumption of a display.

Like the method of FIG. 3, the method of FIG. 4 may be triggered by a person turning on a system like a television set comprising a display.

At 40 in FIG. 4, the method comprises monitoring a movement of one or more persons in front of a display.

At 41, the method comprises monitoring vital functions of the persons like heartbeat or respiration, for example using a micro-Doppler radar as explained above. It should be noted that in some embodiments, as long as movement is detected at 40, the monitoring of vital functions may be omitted, as movement alone may be taken to indicate an awake person in front of the display. It should further be noted that, as already explained previously, the monitoring at 40 and 41 may be performed continuously or in regular or irregular intervals.

At 42, the method comprises checking if a movement is detected. If movement is detected, the method jumps back to 40 to continue monitoring movement and/or vital functions at 40, 41.

If no movement is detected at 42, at 43 it is checked if no vital functions or vital functions indicating sleep are detected. If no vital functions are detected, and no movement is detected, this indicates that no persons are present in front of the display. If vital functions indicating sleep detected, this indicates one or more sleeping persons in front of the display. If no person is detected or all persons are asleep (yes at 43), at 44 the method comprises reducing a display power by turning off the display or reducing a brightness of the display. If vital functions indicating an awake person is detected (no at 43) the method jumps back to 40 to continue monitoring movement at 40 and monitoring vital functions at 41. Also in this embodiment, as explained for FIG. 3, a classification to identify a type of living being may additionally be used.

After the display power has been reduced at 44, in some embodiments monitoring for movement and monitoring vital functions continues. At 45, the method comprises checking if a movement or vital functions indicating wake up of the person (for example increase of heart rate or increase of respiration) are detected. As long as this is not the case, the monitoring and the evaluation at 45 continue. If movement or vital functions indicating wake up are detected, at 46 the method comprises setting the display back to normal operation, for example with full power consumption. Then, the method begins again at 40.

It should be noted that in addition to reducing the display power, when vital functions indicating sleep are detected, the method may further comprise turning audio or the whole TV off or at least to a sleep mode. This may also be applied to TVs or similar devices used for listening to radio stations, which is possible with some TV systems. This is further illustrated in FIGS. 5A-5C.

FIGS. 5A to 5C show an illustrative example for detected respiration, heartbeat and body movement for different cases and corresponding reactions thereto.

FIG. 5A shows an example case when a target, i.e., a person, is present in front of the display. A bar 50A shows an example amount of respiration (breathing rate) detected, a bar 51A shows an example amount of heartbeat detected, and a bar 52A shows an example amount of body movement detected. In this case, body movement is rather high indicating a moving person, and respiration and heartbeat are also relatively high. In this case, the TV is on, the display is on with full power, and audio is also on.

FIG. 5B shows a case where no target is in front of the display. A bar 50B shows the respiration detected, a bar 51B shows the heartbeat detected, and a bar 52B shows the body movement detected. In this case, essentially no respiration, heartbeat or body movement are detected. Some amount of signal may be detected due to noise effects and the like.

In this case, in some embodiments the display is turned off (or the brightness is reduced), but the TV remains on, and the audio also remains on. This reflects for example a case where a person leaves the room for a while, but still wants to hear the TV, for example to realize that advertisements are over and a program the person is watching is resumed, or to realize when for example when watching sports something important happens due to hearing the audio output.

FIG. 5C illustrates a case where a target is in front of the display but sleeping. A bar 50C illustrates the detected respiration, a bar 51C illustrates the detected heartbeat and a bar 52C illustrates the detected movement. In this case, essentially no movement is detected, and respiration and heartbeat are significantly lower (for example lower by a predefined amount or a predefined percentage) than in the case of FIG. 5A. In this case, the TV together with display and audio may be turned completely off in some embodiments, as in this case the person is sleeping. Therefore, depending on detected movement and vital functions, different low power modes (for example the ones illustrated with respect to FIGS. 5B and 5C) may be entered.

Figure 6:
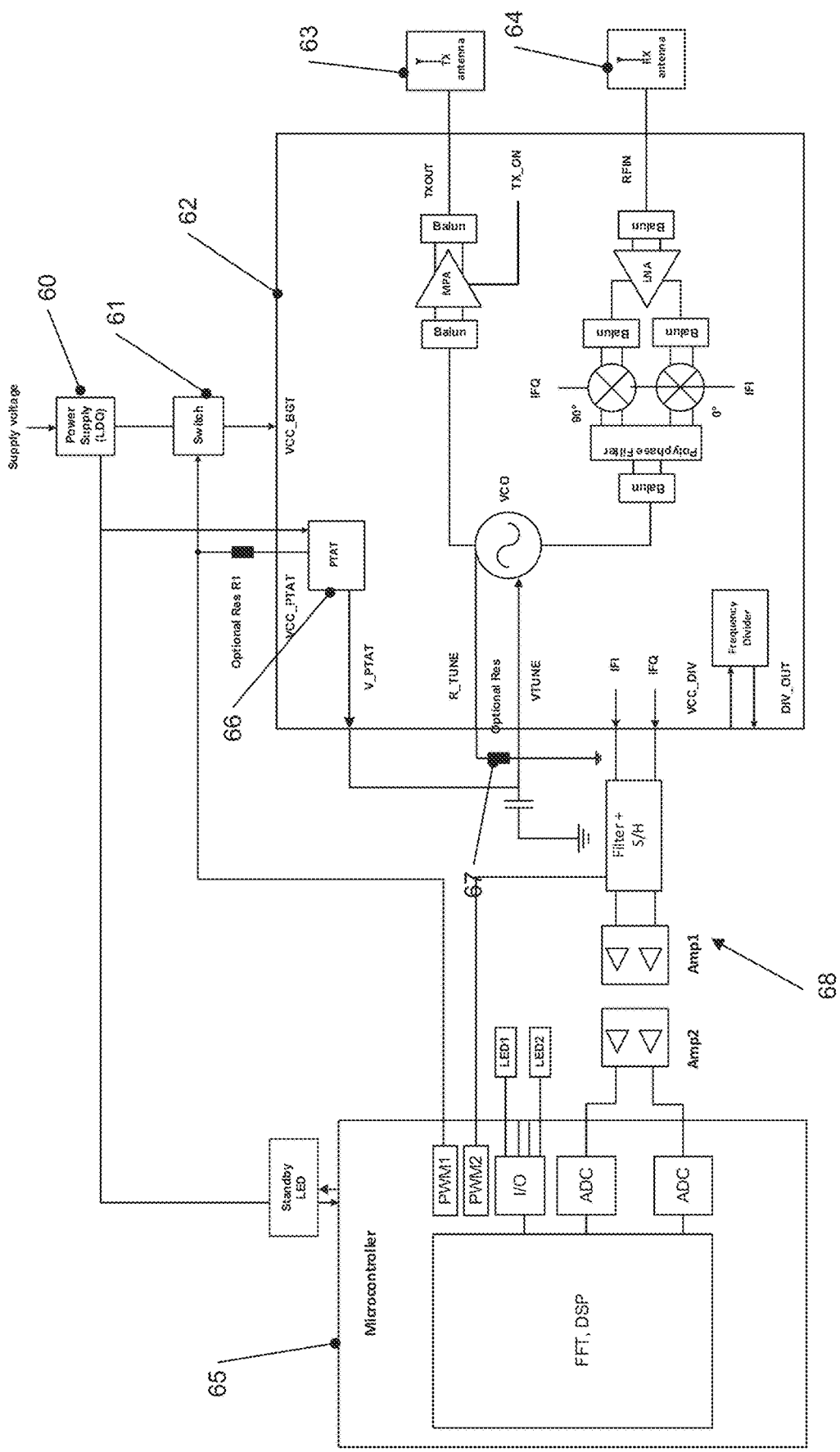
FIG. 6 is a circuit diagram illustrating a system according to an embodiment.

FIG. 6 is a circuit diagram illustrating a system according to an embodiment. While the system of FIG. 6 and also the system of FIG. 9 described later show numerous details, this is only for further illustration and is not to be construed as limiting in any way.

FIG. 6 illustrates a system using a Doppler radar. A Doppler radar uses the Doppler effect to produce velocity data about objects at a distance. Generally, it does so by bouncing a microwave signal off a target, in this case a person, and analyzing how the object's motion has altered the frequency of the returned signal. With such Doppler radars, movement of a person, but also vital functions by detecting the small motion caused by respiration and heartbeat may be detected. In particular, movement of a person may be detected as so-called macro Doppler signature, while vital functions are detected as micro Doppler signature.

As used herein, micro Doppler signature may be described as a characteristic signature in the radar signal due to a physiological movement caused by the displacement of the chest wall of a person due to the heartbeat and respiration rate. The phase of the transmitted radar signal in this case is modulated by the displacement of the chest wall which enables calculating the respiration and heartbeat. When analyzing such a radar signal in the frequency domain spectral components very close to DC values using a Doppler only radar are obtained. These frequencies are far below the Doppler frequencies that are observed due to the body movement of the human being corresponding to walking, moving or running, which are referred to as macro Doppler signatures. To summarize, micro Doppler signatures are caused by motion of the chest wall due to respiration and heartbeat, while macro Doppler signatures are caused by larger motions of larger parts of the human body, in particular the human body as a whole (walking, moving, running etc.).

In case of a frequency modulated continuous wave (FMCW) radar as explained further below with reference to FIG. 9, micro or macro Doppler signatures appear superimposed on top of a beat frequency corresponding to the target distance. Thereby, as will be explained later, FMCW radar may give both distance and vital function information at the same time.

The system of FIG. 6 comprises a Doppler radar circuit 62 coupled to a transmit antenna 63 for transmitting a microwave signal and a receive antenna 64 for receiving the reflected microwave signal. Radar circuit 62 comprises a voltage controlled oscillator (VCO), mixers to generate I- and Q-components from a received signal, amplifiers and baluns. Radar circuit 62 may be a conventional Doppler radar circuit.

Radar circuit 62 is supplied via a power supply 60, for example a low dropout (LDO) regulator, via a switch 61, e.g., a MOSFET switch. By operating switch 61, radar circuit 62 may selectively be switched on all off. For example, as previously noted, radar circuit 62 may be operated in regular or irregular intervals and may be switched off the rest of the time to conserve power.

In the embodiment of FIG. 6, the oscillator is tunable. In particular, radar circuit 62 may be tuned to a desired band, e.g., an ISM (Industrial, Scientific and Medical) band, by applying a voltage at the tuning input port (VTUNE). Furthermore, radar circuit 62 comprises a temperature compensation circuit using a PTAT (proportional to absolute temperature) module 66, which delivers an output voltage (V_PTAT) that helps to keep the radar in the desired band, e.g. ISM band, autonomously over temperature and voltage changes, when connected to a VTUNE port with a filtering shunt capacitor. This autonomous operation enables to use the display control device seamlessly over all countries in the world without any production efforts from the TV manufacturers in some embodiments.

An optional resistor 67 which may be an adjustable resistor can be used to further tune the radar frequency (e.g., certain frequency in the ISM Band) when V_PTAT is connected to the VTUNE port or the VTUNE port is driven by an external voltage source like a DAC for example.

For transmitting signals, a medium power amplifier (MPA) amplifies the output signal from the VCO before feeding the output signal to transmit antenna 63, which may be implemented as an array of micro strip patch antennas. The medium power amplifier has a differential architecture in the embodiment shown, and therefore a balun is used at its input and output to perform a single-ended to differential conversion and vice versa. The receiver path of radar circuit 62 comprises a quadrature homodyne down converter with a low noise amplifier (LNA) to provide a single-ended quadrature output with signals IFI, IFQ. In some embodiments, a frequency divider which may be used when operating the radar circuit with a phase lock loop (PLL) to provide a certain frequency. For low power applications the frequency divider may be kept OFF and operation in a desired band like ISM band is provided by the V_PTAT voltage generated by the module 66.

Output signals IFI, IFQ of radar circuit 62 are provided to a microcontroller 65 via a filter/amplifier chain 68 providing low noise amplification of the radar signal. A sample-and-hold circuit may be used to operate the radar circuit 62 in a duty cycle mode, i.e. in certain intervals, holding output signals while a next output signal from radar circuit 62 is sampled. Suitable filtering circuits before and after the sample and hold circuit may help to improve the sensitivity of the system in some implementations.

The high-pass filters and amplifiers of amplifier/filter chain 68 serve to transfer the signals from radar circuit 62 to microcontroller 65 with little loss or no loss of information. In particular, reflected radar signals from a human target, i.e., a person, are comparatively low in amplitude and therefore need to be amplified to enable microcontroller 65 to process the signals. Signals related to vital functions are usually in the very low frequency domain, and high-pass filters with defined cut-off frequencies serve to extract this information. Cut-off frequencies of high-pass filters used for determining vital functions may have low cut-off frequency close to 0. Furthermore, a low-pass filter may also be provided to improve signal-to-noise ratio and taking into account limits of maximum speed of the target movement that the system may detect.

As power consumption requirements for example in a stand-by mode or also in case of mobile devices are high, as will be explained later using a certain duty cycle which not always operates the radar may help to reduce power consumption by switching radar circuit 62 off at other times using switch 61.

Microcontroller 65 comprises analog-to-digital converters to convert the signals received via amplifier/filter chain 68 to digital format and then processes the signal using for example a digital signal processor (DSP) and/or fast Fourier transforms (FFT). Microcontroller 65 then may control a display and/or audio of a TV or other kinds of display as discussed previously with respect to FIGS. 1 to 5 based on detected vital functions and/or movement of a person.

Furthermore, microcontroller 65 may control indicators like LEDs, for example a standby LED or other LED showing the status of operation, for example indicating standby, switched off or other modes of operation of the display.

The fast Fourier transform may be used to convert the signals to a frequency spectrum. Movement of the person as a whole or the chest (from respiration or heartbeat) produces peaks in the frequency spectrum which are then used to determine the movement and vital functions.

A display or other parts of an entertainment system may be controlled via an I port of microcontroller 65, e.g. a general purpose I/O port (GPIO). Microcontroller 65 may include timers to control the above-described duty cycles.

Figure 7:
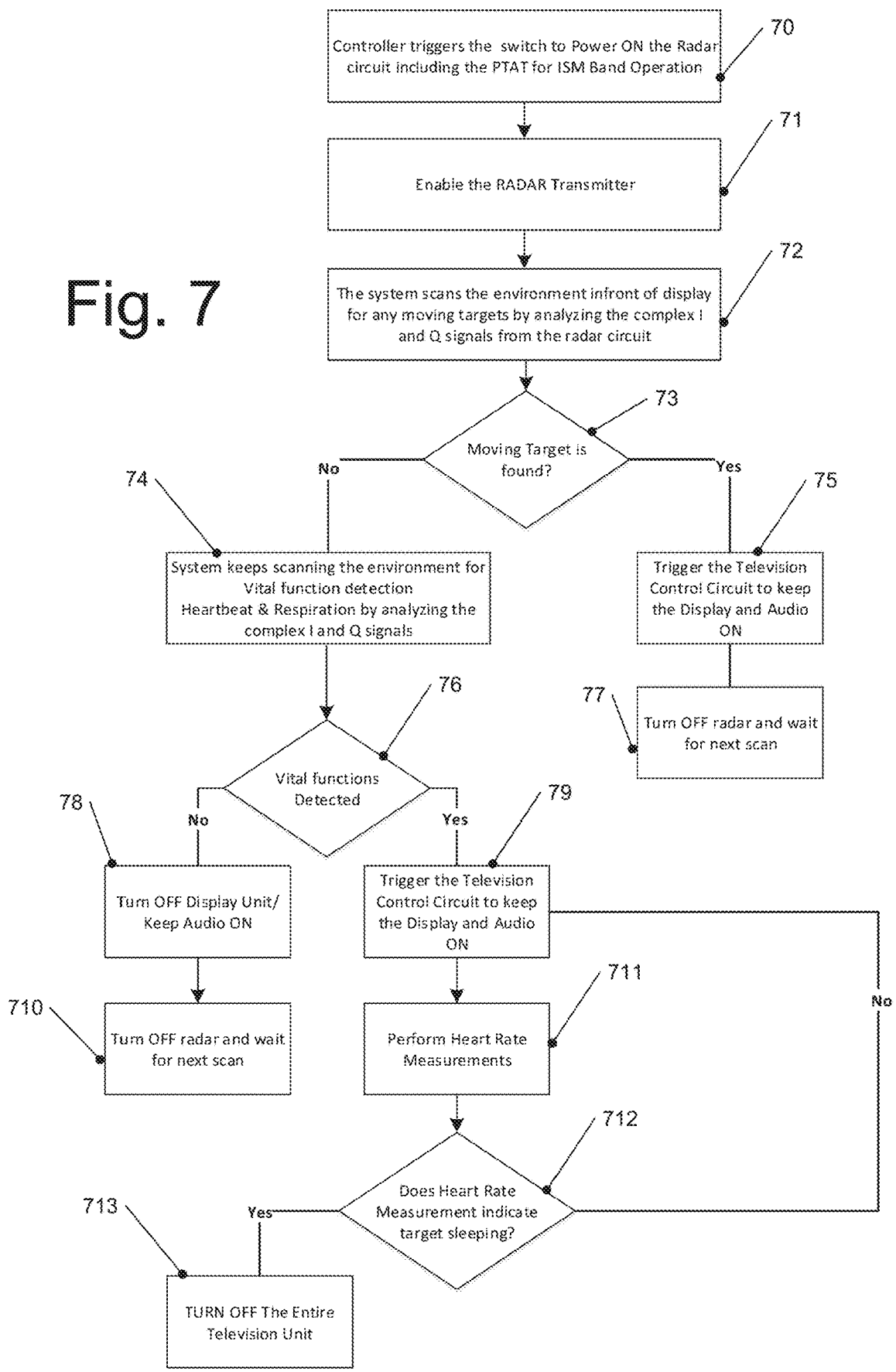
FIGS. 7 and 8 are flowcharts illustrating operation of the system of FIG. 6.
Figure 8:
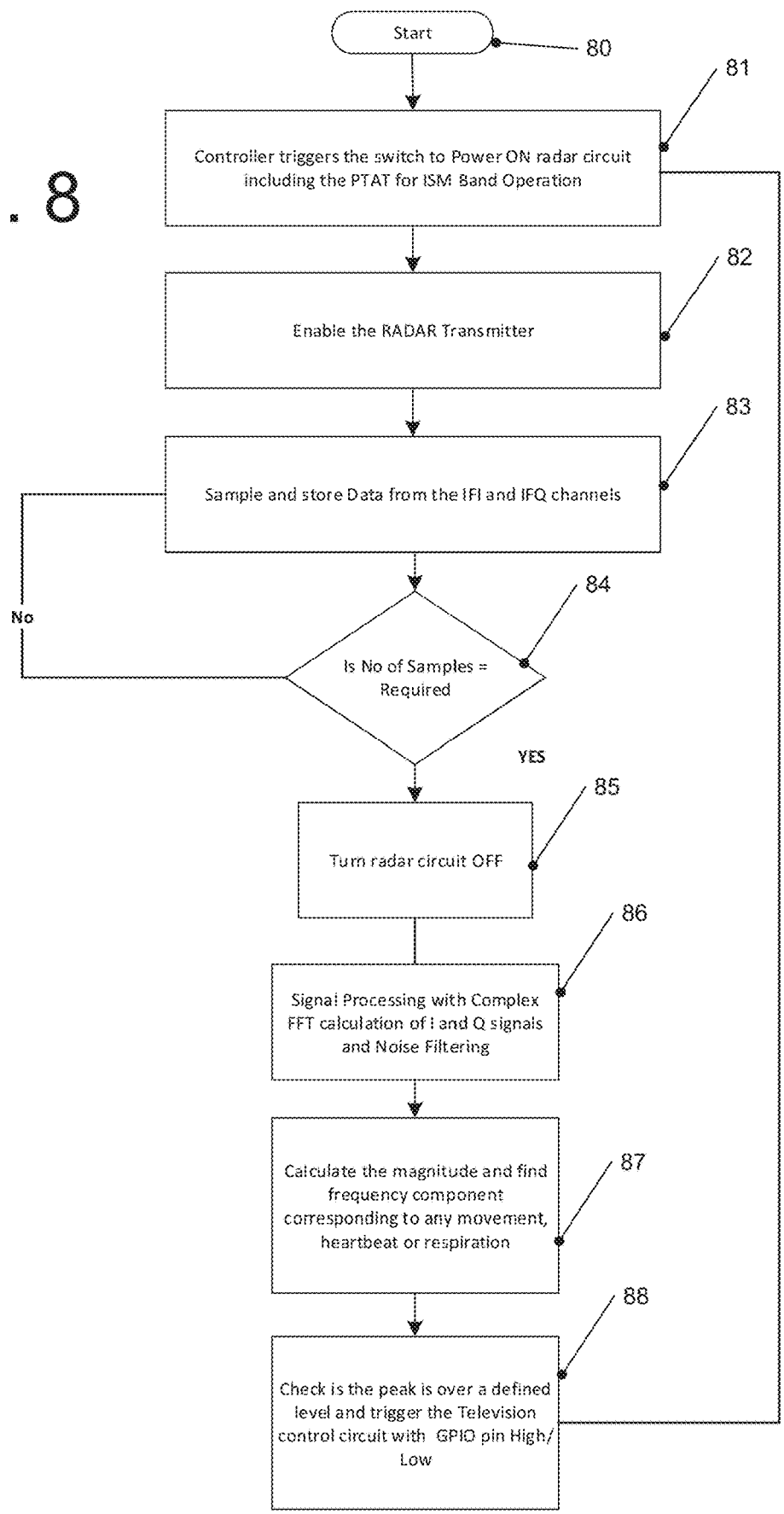

An example operation of the embodiment of FIG. 6 will now be described referring to FIGS. 7 and 8. FIG. 7 is a flowchart illustrating general operation of the embodiment, while FIG. 8 is a flowchart illustrating a specific example of the radar operation.

At 70, microcontroller 65 controls switch 61 to power on radar circuit 62 including PTAT 66 for radar operation in an ISM band. At 71, within radar circuit 62 the transmitter (VCO followed by MPA to output a transmit signal to transmit antenna 63) is enabled.

At 72, the system of FIG. 6 scans the environment in front of the display for any moving targets by analyzing the IFI and IFQ signals from radar circuit 62 in microcontroller 65. At 73, the method comprises determining if a moving target is found. If this is the case, at 75 a television control circuit of a television or other display device (e.g., on/off circuitry 28 of FIG. 2) is controlled to keep both display and audio off. At 77, then the radar circuit is turned off by controlling switch 61 until a next scan, for example after some predefined intervals.

If no moving target is found at 73, at 74 the system of FIG. 6 keeps scanning the environment for vital function detection, in particular heartbeat and respiration, by analyzing the signals IFI, IFQ in microcontroller 65.

At 76, the method comprises checking if vital functions are detected. If this is not the case, at 78 the display is turned off, and the audio is kept on, corresponding to the case of FIG. 5B. If vital functions are detected, at 79 at first the display and audio are kept on. At 711, heart rate measurements are performed. At 712, the method comprises checking if the heart rate measurements indicate a sleeping target. In addition to or as an alternative to heart rate measurements, at 711 and 712 also breathing rate measurements may be used. If the heart rate measurement indicates no sleeping target, the method jumps back to 79. If the heart rate measurement indicates a sleeping target, the television set (or other system) is turned off at 713, corresponding to the case at FIG. 5C. After 713, like 77 or 710, the radar circuit may be turned off until a next scan. Also in case the method jumps back to 79, the heart rate measurements at 711 may be performed in some intervals, and radar circuit 62 may be turned off between these intervals.

FIG. 8 describes the radar operation used in the method of FIG. 7 in some more detail. The method starts at 80. At 81 and 82, the method comprises switching on the radar circuit 62 and enabling the radar transmitter, corresponding to 70 and 71 of FIG. 7. At 83, the method of FIG. 8 comprises sampling and storing data corresponding to the IFI and IFQ signals of radar circuit 62, for example using the already mentioned sample-and-hold circuit. At 84, the method comprises checking if a number of samples required for the subsequent analysis have been obtained. As long as this is not the case, the method jumps back to 83 to obtain further samples. When the required number of samples is required, at 85 radar circuit 62 is turned off via switch 61. At 86, the samples are processed including a complex fast Fourier transform calculation of the samples of the IFI and IFQ signals and noise filtering. At 87, the method comprises calculating signal magnitudes in Fourier space (frequency spectrum) and, in Fourier space, finding frequency components corresponding to movement, heartbeat and respiration. At 88, the method comprises checking if peaks in the frequency spectrum corresponding to movement, heartbeat or respiration are over a defined level and trigger the television control circuit accordingly to keep the television on, turn only the display off or turn the television off completely, as discussed for the various cases of detected movement and detected heartbeat/respiration discussed with reference to FIG. 7. After 88, the method continues in a next radar cycle again at 81.

Figure 9:
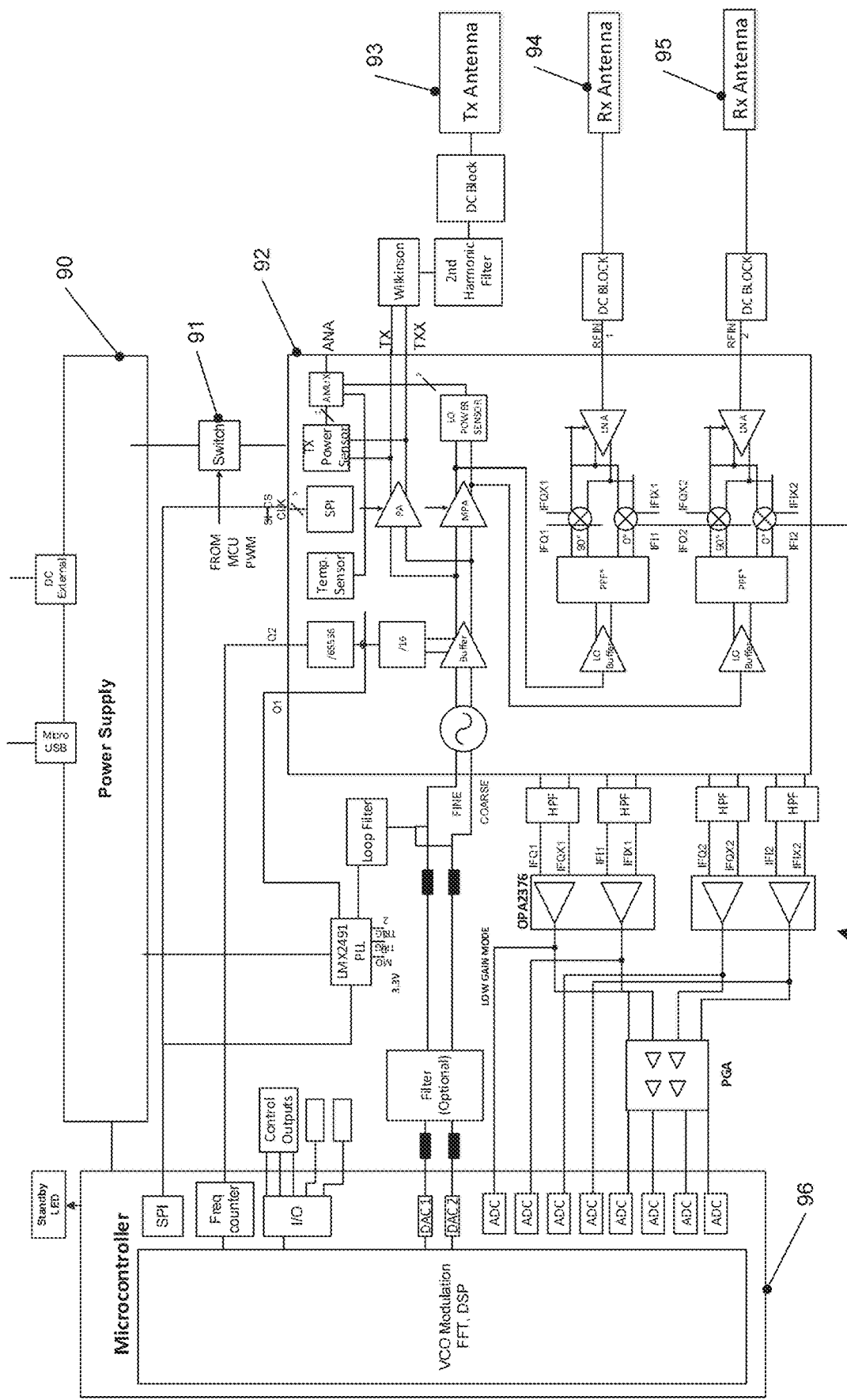
FIG. 9 is a circuit diagram illustrating a system according to a further embodiment.

FIG. 9 illustrates a system according to an embodiment using a frequency modulated continuous wave (FMCW) radar. In some embodiments, using a FMCW radar, a precision for detecting vital functions may be higher than for a Doppler radar, and/or more than one person may be monitored. On the other hand, in some embodiments a Doppler radar system may be cheaper than a FMCW radar system.

In FMCW radar systems, the frequency of the signal transmitted from the radar is not a single tone, i.e., single frequency, but the frequency is modulated to generate a linear ramp of frequencies. The ramp may be sawtooth, triangular, stepped triangular of same or different durations. Frames of such ramps of same duration or arbitrary durations are generated in FMCW radar. This enables to measure the distance of a target, such that different targets, in this case different persons, may be separated based on their distances. Furthermore, precise detection or measurement of vital functions is possible for a plurality of users based on the distance separation. In such systems, for example first a scan is performed to detect the presence of one or more persons in different distances, and then vital functions and/or movement is detected for these persons.

The system of FIG. 9 comprises a FMCW radar circuit 92 which is coupled to an array of transmit antennas 93 via a power combiner and a harmonic filter. The harmonic filter may help to attenuate second, third and fourth order harmonics according to frequency regulations and is coupled to one or more arrays of receive antennas 94, 95, in this case two arrays of receive antennas. For each array of receive antennas, radar circuit 92 comprises a receiver path, two in the example shown). Radar circuit 92 comprises oscillators, buffers, mixers, amplifiers and sensors like temperature sensors to provide FMCW radar functions. Radar circuit 92 itself may be implemented in any conventional manner and may be a conventional FMCW radar chip, for example Infineon's BG24MTR12. The system of FIG. 9 is supplied by a power supply 90, where radar circuit 92 is receiving power from power supply 90 via a switch 91, e.g., a MOSFET switch controlled by a microcontroller 96. As explained for switch 61 of FIG. 6, using switch 91 radar circuit 92 may be switched on and off, for example for operation in regular or irregular intervals.

The system of FIG. 9 further comprises a phase locked loop (PLL) coupled to a loop filter for providing a frequency ramp to radar circuit 92. Correspondingly, a transmit signal from radar circuit 92 transmitted via antenna array 93 has a linear frequency ramp which is reflected back from persons present in the room. Based on the locations of the persons relative to the radar circuit 92, the reflected signal is delayed in time, and this delay is then later used to calculate distances in microcontroller 96. Roughly speaking, the frequency of the received signal gives an indication at which time the signal was transmitted (based on the varying frequency), and hence the time delay and the distance may be calculated.

For these and other calculations in microcontroller 96, received signals are provided to microcontroller 96 via a filter/amplifier chain 97, the function of which generally corresponds to the function of filter/amplifier chain 98 discussed referring to FIG. 6. The signals are then digitized in microcontroller 96 using analog-to-digital converters and processed for example by a fast Fourier transform. An example for microcontroller 96 is Infineon's XMC4700.

Based on the frequency ramp used for the radar signals, for example a ramp from 24.00 to 24.250 GHz or to 61 to 61.5 GHz or 57 to 64 GHz or any other ISM or other bands, persons spaced closely together can be resolved with high accuracy and distances to them and their vital functions can be captured accurately.

In some embodiments, first a distance measurement to one or more persons is performed, such that the number of persons is identified. Then, vital functions like heartbeat and breathing of one or more persons can be detected and measured.

By using multiple receivers with associated receive antenna array 94, 95 and possibly multiple transmitters (one transmit antenna array 93 shown in FIG. 9), the exact location (angle) of the persons and not only the distance to the radar may be detected by using several algorithmic techniques like phase monopulse, spirit, music etc. All concepts of digital beamforming techniques can be applied to such a system to effectively locate the position of the targets in front of the radar. In other embodiments, a single receive antenna array with a single receiver may be provided to determine only the distance.

Figure 5:
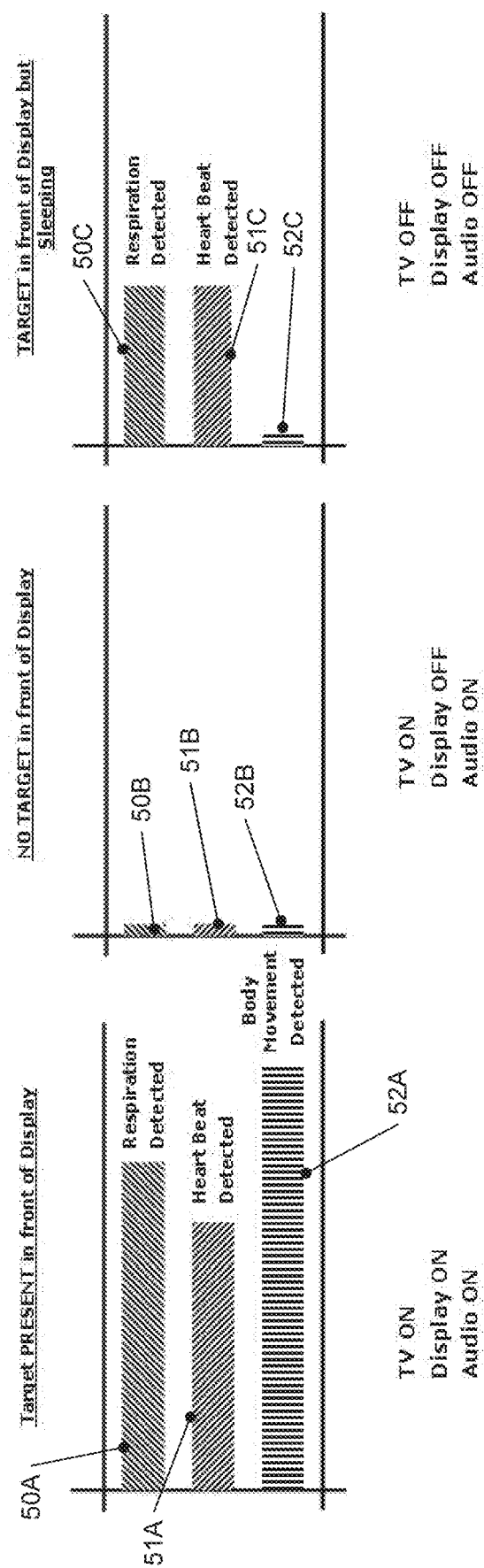
FIGS. 5A to 5C are diagrams illustrating various modes of a system.

Control of the display with the embodiment of FIG. 9 is performed in a similar manner as discussed previously for other embodiments, for example as generally discussed with reference to FIGS. 3-5, including the possibility of different modes as shown in FIGS. 5B and 5C. In cases where more than one person is detected, the display power is only reduced when no persons are detected (all persons left the area) or all persons are asleep, while the normal operation of the display is maintained as long as one awake person is in front of the display.

A more detailed example operation of the embodiment of FIG. 9 will now be discussed referring to FIG. 10.

Figure 10:
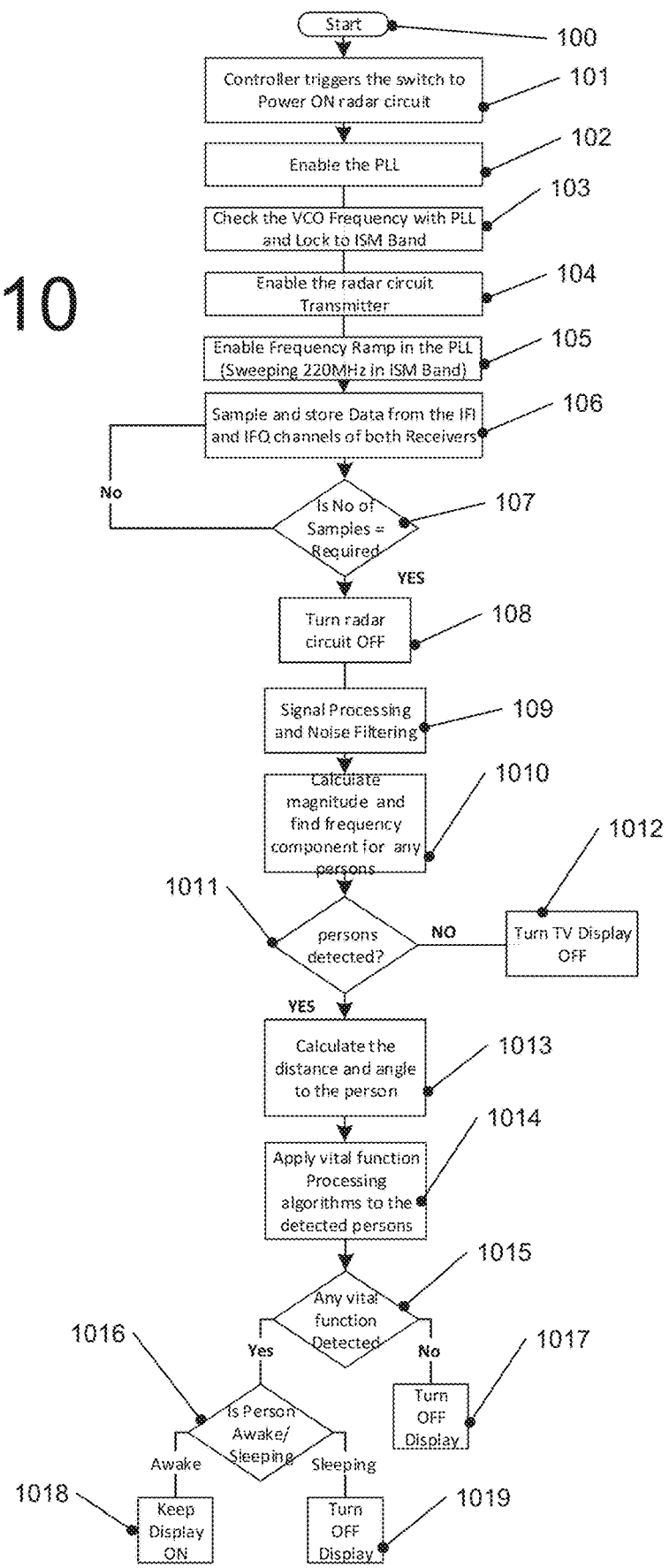
FIG. 10 is a flowchart illustrating operation of the system of FIG. 9.

The method starts at 100 in FIG. 10. At 101, microcontroller 96 controls switch 91 to power on radar circuit 92. At 96, the method comprises enabling the PLL. At 103, the frequency of a voltage-controlled oscillator of radar circuit 92 is controlled and checked using the PLL and locked to an ISM band. The control of the transmitter frequency may be done by both hardware or software based PLL approaches. When using a software PLL approach, the hardware PLL on the system can be removed and the tuning ports of the radar circuit can be connected to the DAC of the microcontroller or an external DAC to lock the frequency as well as generate the ramps for FMCW. In our example two tuning ports VCOARSE and VFINE are connected to two different DACs (Digital to Analog Converters) on microcontroller 96 for highly efficient software based control of the output frequency At 104, the transmitter of the radar circuit is enabled.

At 105, the frequency ramp in the PLL is enabled, for example to perform a sweep across 220 MHz in an ISM band.

At 106, the method comprises sampling and storing data from IFI and IFQ signals of both receiver paths of radar circuit 92 using for example the baseband amplifiers with high pass filters and programmable gain amplifier circuitry as shown in the FIG. 9 generally at 97. The high pass filters in the FMCW operation may be designed to reduce the TX to RX leakage significantly and thereby enhance the receiver sensitivity in some embodiments.

At 107, the method comprises checking if a number of required samples have been reached, similar to 84 in FIG. 8. If this is not the case, the method jumps back to 106 to obtain additional samples. If a required number of samples have been reached, at 108 comprises turning off the radar circuit, and at 109 processing of the samples starts.

The processing may comprise noise filtering and performing a Fourier transform like a fast Fourier transform into the frequency domain. At 1010, the method then comprises calculating signal magnitudes (peaks) in the Fourier transform for the signals and find frequency components indicative of targets at a particular distance and angle. The noise filtering function may comprise algorithms to remove unwanted clutter from the environment. At 1011, the method comprises checking if any human targets are detected at 1010 corresponding to the peaks in the frequency spectrum (i.e., any movement in the form of macro Doppler signature, heartbeat and/or respiration in the form of micro Doppler). If this is not the case, at 1012 the TV display is turned off (corresponding to the case of FIG. 5B), and in a next cycle the method is resumed at 100.

If persons are detected, at 1013 the method comprises calculating distance and angles to the targets as discussed above based on the signals from the two receivers. At 1014, vital function processing algorithms are applied to the detected persons separately to detect heartbeat and/or respiration for the respective human targets. At 1015, the method may check if any vital functions are detected. If this is not the case, this may indicate that what was detected as persons are actually not persons, but any other objects which have been detected, and consequently the display is turned off at 1017. If vital functions are detected, at 1016 the method comprises checking if the respective persons are awake or sleeping. If at least one person is awake, at 1018 the display is kept on. If all persons are sleeping, at 1019 the display, possibly together with audio, and/or the complete television set, is turned off, corresponding to the case of FIG. 5C.

It should be noted in any of the embodiments discussed above, in addition to controlling the display based on the detected vital functions, the vital functions may also be displayed on the display so that the person can view the vital functions. This display may for example be in a small edge of the display in order not to impede viewing of a program shown on the display. In this case, for example a television or other entertainment system may monitor the health of persons viewing it constantly without invading privacy and can give for example a warning if an abnormal condition, for example abnormal respiratory rates like apnea or dyspnea, are detected.

Figure 11:
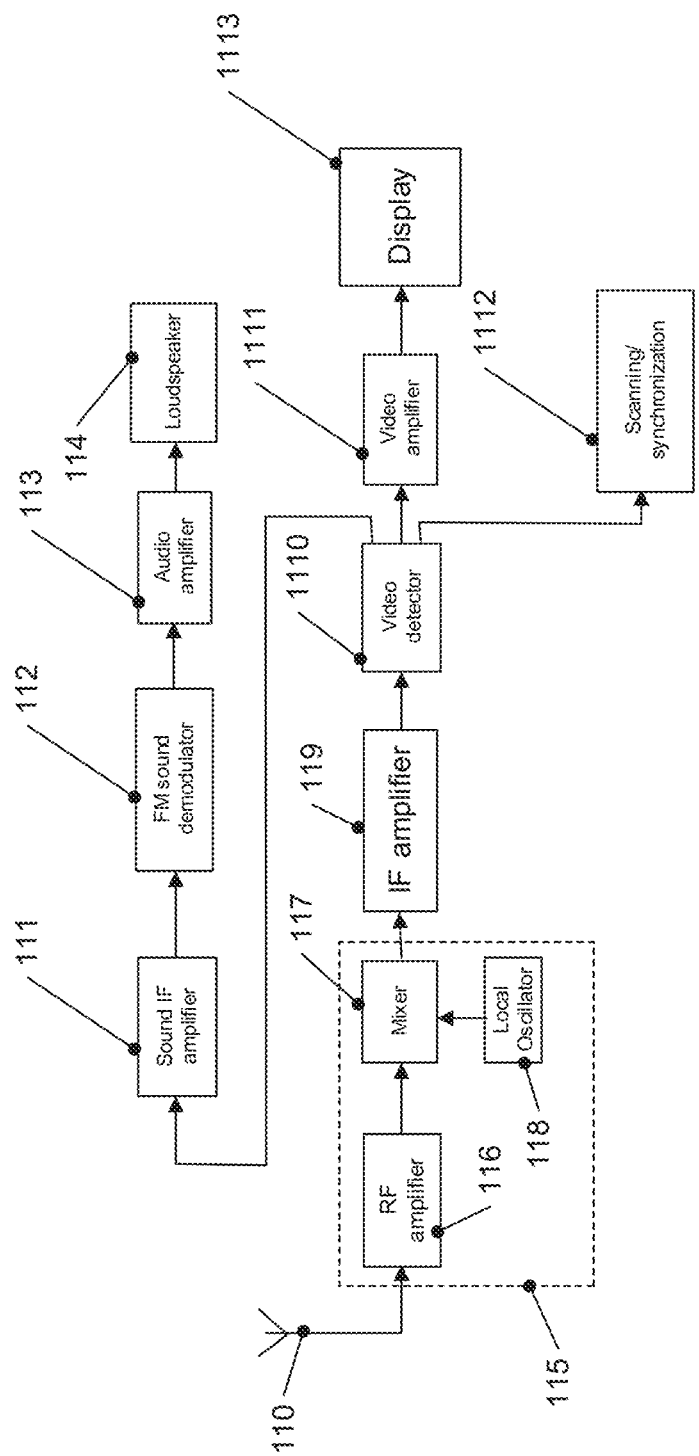
FIG. 11 is a block diagram illustrating a television system as an example application for some embodiments.

For completeness' sake, FIG. 11 illustrates a block diagram of a TV which may be controlled using the techniques discussed above. The TV of FIG. 11 receives signals via a receiving antenna no. Instead of an antenna, the TV may also receive signals via a satellite dish, via an IP network (IPTV) or via a cable.

The thus provided signal in the example of FIG. 11 is provided to a radio frequency (RF) tuner 115 comprising an RF amplifier 116 and a mixer 117 where the received signal is mixed with a signal from a local oscillator 118 to provide an intermediate frequency (IF) signal. The signal is amplified by an amplifier 119 and processed by a video detector 1110, which separates video signal, sound signal and synchronization signals. The video signal is amplified by a video amplifier 1111 and, in the example of FIG. 11, provided to a display 1113. In embodiments, various kinds of displays like LCD displays, LED displays or OLED displays may be used, which may comprise a backlight. In older models, also picture tubes may be used. Display 1113 is controlled by scanning and synchronization circuits 1112 based on the synchronization signal extracted by video detector 1110. Furthermore, a sound signal extracted by video detector 1110 is provided to a sound amplifier 111 followed by a sound demodulator which provides a signal in the audio band, which is then amplified by an audio amplifier 113 and output by a loudspeaker 114. The block diagram is merely an example, and any conventional systems comprising a display, for example TVs, entertainment systems like in-flight entertainment systems or computers may be used.

In case the power is to be reduced, for example in the case of FIG. 5B where the display is turned off, but audio remains on, elements 1111, 1112 and 1113 in FIG. 11 may be deactivated, such that audio output is still possible. In case of FIG. 5C, essentially all the elements of FIG. 11 may be deactivated to save more power.

At least some embodiments are defined by the following examples, which are not to be construed as limiting:

Example 1

A display control device, comprising:
a radar circuit, and
an evaluation circuit configured to detect a vital function of a person based on a signal from the radar circuit and control a power consumption of a display based on the detected vital function.

Example 2

The display control device of example 1, wherein the evaluation circuit is additionally configured to detect movement of the person based on the signal from the radar circuit and control power consumption of the display based on the detected movement.

Example 3

The display control device of example 2, wherein detecting the vital functions is triggered by detecting a movement.

Example 4

The display control device of any one of examples 1-3, wherein detecting the vital functions comprises detecting a micro-Doppler signature of human respiration or/and heartbeat rate.

Example 5

The display control device of example 1-4, wherein controlling power consumption of the display comprises reducing power consumption of the display when the vital function indicates that the person is sleeping.

Example 6

The display control device of example 5, wherein the evaluation circuit for controlling the power consumption is configured to set a device including the display to a first low power mode when the vital function indicates that the person is sleeping and to a second low power mode different from the first low power mode when the signal from the radar circuit indicates that no person is in front of the display.

Example 7

The display control device of example 6, wherein the first low power mode comprises reducing power consumption of the display and disabling an audio output of the device, and wherein the second low power mode comprises reducing power consumption of the display and maintaining audio output of the device.

Example 8

The display control device of any one of examples 4-7, wherein the evaluation circuit is further configured to control the display to revert to a normal mode of operation when the vital function indicates that the person has woken up.

Example 9

The display control device of any one of examples 1-8, wherein controlling the power consumption comprises one or more of controlling a brightness of the display, controlling an on/off state of the display, controlling a contrast of the display, controlling color saturation of the display, or controlling a backlight of the display.

Example 10

The display control device of any one of examples 1-9, wherein the evaluation circuit is configured to detect vital functions of a plurality of persons including the person based on the signal from the radar circuit, and to control the power consumption of the display based on the vital functions of the plurality of persons.

Example 11

The display control device of any one of examples 1-10, wherein the radar circuit is configured to operate in regular or irregular intervals.

Example 12

The display control device of any one of examples 1-11, wherein the evaluation circuit is further configured to control the display to display the detected vital function.

Example 13

The display control device of any one of examples 1-12, wherein the vital function comprises a heartbeat of the person and/or a breathing rate of the person.

Example 14

The display control device of any one of examples 1-13, wherein the evaluation circuit is further configured to identify a type of living being based on the vital function, and to control the display based on the identified type of living being.

Example 15

The display control device of any one of examples 1-14, wherein the radar circuit comprises a band regulation circuit configured to keep radar operation in a predefined band over at least one of voltage or temperature variations.

Example 16

An entertainment system, comprising a display control device of any one of examples 1-15, and a display controlled by the display control device.

Example 17

A display control method, comprising:
monitoring a vital function of a person using a radar circuit, and
controlling power consumption of a display based on the monitored vital function.

Example 18

The method of example 17 additionally comprising detecting movement of the person based on using the radar circuit and controlling power consumption of the display based on the detected movement.

Example 19

The method of example 17 or 18, wherein controlling power consumption of the display comprises reducing power consumption of the display when the vital functions indicate that the person is sleeping.

Example 20

The method of example 19, wherein reducing the power consumption comprises setting a device including the display to a first low power mode when the vital functions indicate that the person is sleeping and to a second low power mode different from the first low power mode when using the radar circuit it is determined that no person is in front of the display.

Example 21

The method of example 20, wherein the first low power mode comprises reducing power consumption of the display and disabling an audio output of the device, and wherein the second low power mode comprises reducing power consumption of the display and maintaining audio output of the device.

Example 22

The method of any one of examples 17-21, wherein the method comprises detecting vital functions of a plurality of persons including the person using the radar circuit, and controlling the power consumption of the display based on the vital functions of the plurality of persons.

Example 23

The method of any one of examples 17-22, further comprising operating the radar circuit in regular or irregular intervals.

Example 24

The method of any one of examples 17-23, further comprising keeping radar operation in a predefined band over at least one of voltage or temperature variations.

Example 25

A computer program comprising a program code, which, when executed on a processor, causes execution of the method of any one of examples 17-24.

This may relate to programming a controller which controls e.g., radar circuits and evaluates the signals to perform the method.

Example 26

A tangible storage medium, comprising the computer program of example 25.

Example 27

A display control device, comprising:
means for monitoring a vital function of a person using a radar circuit, and
means for controlling power consumption of a display based on the monitored vital function.

Example 28

The device of example 27 additionally comprising means for detecting movement of the person based on using the radar circuit and controlling power consumption of the display based on the detected movement.

Example 29

The device of example 27 or 28, wherein the means for controlling power consumption of the display comprises means for reducing power consumption of the display when the vital functions indicate that the person is sleeping.

Example 30

The device of example 29, wherein the means for reducing the power consumption comprises means for setting a device including the display to a first low power mode when the vital functions indicate that the person is sleeping and to a second low power mode different from the first low power mode when using the radar circuit it is determined that no person is in front of the display.

Example 31

The device of example 30, wherein the first low power mode comprises reducing power consumption of the display and disabling an audio output of the device, and wherein the second low power mode comprises reducing power consumption of the display and maintaining audio output of the device.

Example 32

The device of any one of examples 27-31, wherein the device comprises means for detecting vital functions of a plurality of persons including the person using the radar circuit, and means for controlling the power consumption of the display based on the vital functions of the plurality of persons.

Example 33

The device of any one of examples 27-32, further comprising means for operating the radar circuit in regular or irregular intervals.

Example 34

The device of any one of examples 27-33, further comprising means for keeping radar operation in a predefined band over at least one of voltage or temperature variations.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A display control device, comprising:
a radar circuit, and
an evaluation circuit configured to:
detect vital functions of a plurality of living beings including a first living being based on a signal from the radar circuit,
identify a type of living being for each of a plurality of types of living being based on the detected vital functions, wherein the plurality of types of living beings comprises a human being and a non-human animal, and wherein human beings are distinguished from non-human animals based on the detected vital functions, and
control a power consumption of a display based on the detected vital functions of the plurality of living beings by turning on the display or keeping the display on only when the identified type of at least one living being of the plurality of living beings is the human being and not the non-human animal.

2. The display control device of claim 1, wherein the evaluation circuit is further configured to:
detect movement of the first living being based on the signal from the radar circuit, and
control power consumption of the display based on the detected movement.

3. The display control device of claim 2, wherein the evaluation circuit further configured to trigger detecting the vital function by detecting the movement of the first living being.

4. The display control device of claim 1, wherein:
the first living being is identified as a human being; and
the evaluation circuit is configured to control the power consumption of the display by reducing the power consumption of the display when the vital function indicates that the first living being is sleeping.

5. The display control device of claim 4, wherein the evaluation circuit is configured to set a device including the display to a first low power mode when the vital function indicates that the first living being is sleeping and to a second low power mode different from the first low power mode when the signal from the radar circuit indicates that no living being is in front of the display.

6. The display control device of claim 5, wherein the evaluation circuit is configured to set the device including the display to the first low power mode by reducing the power consumption of the display and disabling an audio output of the device, and wherein the evaluation circuit is configured to set the device including the display to the second low power mode by reducing the power consumption of the display and maintaining the audio output of the device enabled.

7. The display control device of claim 4, wherein the evaluation circuit is further configured to cause the display to revert to a normal mode of operation when the vital function indicates that the first living being has woken up.

8. The display control device of claim 1, wherein controlling the power consumption comprises one or more of controlling a brightness of the display, controlling an on/off state of the display, controlling a contrast of the display, controlling color saturation of the display, or controlling a backlight of the display.

9. The display control device of claim 1, wherein the radar circuit is configured to operate in regular or irregular intervals.

10. The display control device of claim 1, wherein the evaluation circuit is further configured to control the display to display the detected vital function.

11. The display control device of claim 1, wherein the vital functions comprises a heart rate a breathing rate.

12. An entertainment system, comprising the display control device of claim 1, and the display controlled by the display control device.

13. A display control method, comprising:
detecting vital functions of a plurality of living beings including a first living being using a radar circuit;
identifying a type of living being for each of a plurality of types of living being based on the detected vital functions, wherein the plurality of types of living beings comprises a human being and a non-human animal, and wherein human beings are distinguished from non-human animals based on the detected vital functions; and
controlling a power consumption of a display based on the vital functions of the plurality of living beings by turning on the display or keeping the display on only when the identified type of at least one living being of the plurality of living beings is the human being and not the non-human animal.

14. The method of claim 13, further comprising:
detecting movement of the first living being based on using the radar circuit; and
controlling the power consumption of the display based on the detected movement.

15. The method of claim 13, wherein:
the first living being is identified as a human being; and
controlling the power consumption of the display comprises reducing the power consumption of the display when the vital function indicates that the first living being is sleeping.

16. The method of claim 15, wherein reducing the power consumption comprises setting a device including the display to a first low power mode when the vital function indicate that the first living being is sleeping and to a second low power mode different from the first low power mode when, using the radar circuit, it is determined that no living being is in front of the display.

17. The method of claim 16, wherein the first low power mode comprises reducing the power consumption of the display and disabling an audio output of the device, and wherein the second low power mode comprises reducing the power consumption of the display and maintaining audio output of the device.

18. The method of claim 13, further comprising operating the radar circuit in regular or irregular intervals.

19. A display control device, comprising:
a radar circuit, and
an evaluation circuit configured to:
detect a vital function of a living being based on a signal from the radar circuit,
identify a type of living being from a plurality of types of living beings based on the detected vital function, wherein the plurality of types of living beings comprises a human being and a non-human animal, and wherein human beings are distinguished from non-human animals based on the detected vital function, and control a power consumption of a display by turning on the display or keeping the display on only when the identified type is a human being and not a non-human animal.

* * * * *